United States Patent
Cohen (10) Patent No.: US 10,339,580 B2
(45) Date of Patent: Jul. 2, 2019

(54) PERSONALIZED CONTENT GENERATION AND DELIVERY

(71) Applicant: Jason Cohen, Stamford, CT (US)

(72) Inventor: Jason Cohen, Stamford, CT (US)

(73) Assignees: SONY CORPORATION, Tokyo (JP); SONY MUSIC ENTERTAINMENT, New York, NY (US)

( * ) Notice: Subject to any disclaimer, the term of this patent is extended or adjusted under 35 U.S.C. 154(b) by 354 days.

(21) Appl. No.: 13/794,495

(22) Filed: Mar. 11, 2013

(65) Prior Publication Data

US 2014/0081796 A1 Mar. 20, 2014

Related U.S. Application Data

(60) Provisional application No. 61/701,243, filed on Sep. 14, 2012.

(51) Int. Cl.
G06Q 30/00 (2012.01)
G06Q 30/06 (2012.01)
G06F 16/638 (2019.01)

(52) U.S. Cl.
CPC ....... G06Q 30/0621 (2013.01); G06F 16/639 (2019.01); G06Q 30/00 (2013.01)

(58) Field of Classification Search
CPC ........... G06Q 30/0601; G06Q 30/0643; G06Q 30/0621
See application file for complete search history.

(56) References Cited

U.S. PATENT DOCUMENTS

| | | | |
|---|---|---|---|
| 5,459,819 A * | 10/1995 | Watkins et al. | 358/1.18 |
| 7,765,245 B2 * | 7/2010 | Nichols et al. | 707/825 |
| 8,060,825 B2 * | 11/2011 | Chaudhri | 715/719 |
| 8,190,519 B1 * | 5/2012 | Angilivelil et al. | 705/39 |
| 8,601,372 B1 * | 12/2013 | Gentile et al. | 715/716 |
| 2002/0065741 A1 * | 5/2002 | Baum | G03D 15/005 705/26.5 |
| 2005/0010589 A1 * | 1/2005 | Novak | G06F 17/30749 |
| 2007/0203845 A1 * | 8/2007 | Gross et al. | 705/59 |
| 2008/0028918 A1 * | 2/2008 | Latour | 84/610 |
| 2008/0154962 A1 | 6/2008 | Yu et al. | |
| 2009/0150797 A1 * | 6/2009 | Burkholder et al. | 715/747 |
| 2010/0054601 A1 * | 3/2010 | Anbalagan et al. | 382/180 |
| 2011/0282867 A1 * | 11/2011 | Palermiti et al. | 707/722 |
| 2013/0317936 A1 * | 11/2013 | Hughes | G06Q 30/06 705/26.5 |

OTHER PUBLICATIONS

Adam Pash, "Create a gift CD with custom album art," Feb. 7, 2006, https://lifehacker.com/create-a-gift-cd-with-custom-album-art-153273 (Year: 2006).*

* cited by examiner

*Primary Examiner* — Marissa Thein
*Assistant Examiner* — Lance Y Cai
(74) *Attorney, Agent, or Firm* — Trellis IP Law Group, PC (57) ABSTRACT

Software replaces album art stored in metadata of a music file with a personalized picture that is displayed when the music file is played on a music player device. The personalized picture may be selected from diverse sources such as social media sites or hard drives on computers. The personalized music file may be gifted to intended recipients and downloaded to their music player devices. The personalized picture is displayed when the personalized music file is played on the music player device.

9 Claims, 9 Drawing Sheets

PERSONALIZED CONTENT GENERATION AND DELIVERY

CROSS REFERENCES TO RELATED APPLICATIONS

This application claims priority from U.S. Provisional Patent Application Ser. No. 61/701,243, entitled PERSONALIZED CONTENT GENERATION AND DELIVERY, filed on Sep. 14, 2012, which is hereby incorporated by reference as if set forth in full in this application for all purposes.

BACKGROUND

With the advent of digital music downloadable to portable devices it has become more difficult to attach a "look and feel" to music or to personalize gifts of music. When gifting music embodied in tangible media it is possible to attach notes, comments and pictures to personalize the gift. Digital downloads do not afford such opportunities.

MP3 players come in a variety of different styles and looks. Almost all MP3 players provide the user with audio and visual content and can be used to download and listen to songs. Along with audio content, a downloaded MP3 file includes metadata that can include an album or song cover. When the MP3 player is used to listen to the song the album or song cover is displayed by the device.

SUMMARY

One example embodiment is a web service that provides for personalization of digital music files using a graphical user interface (GUI) displayed on a client computer. User interface pages are displayed to allow a user to select music files, select pictures to associate with files to create personalized music files, and to publish or gift the personalized music files to friends, colleagues or the user.

In an example embodiment, a server computer receives an identification of a selected song, an associated picture, a gift recipient address and a personalized message from a client computer over a network. The server application deletes the album art picture from the metadata, overlays the album art picture over a portion of the associated picture to form an overlaid associated picture and inserts the overlaid associated picture into the metadata to form a personalized song music file.

In an example embodiment, the server bundles all personalized song files intended for a particular recipient and emails a tokenized URL to the intended recipient that allows the intended recipient to download the bundled personalized song files.

In another example embodiment, the user pays for the songs using internet payment protocols prior to personalizing the music files.

In another example embodiment, an application is downloaded to a user device so that personalization of music files and publishing of music files is performed on the user device.

A further understanding of the nature and the advantages of particular embodiments disclosed herein may be realized by reference to the remaining portions of the specification and the attached drawings.

DETAILED DESCRIPTION OF EMBODIMENTS

Figure 1:
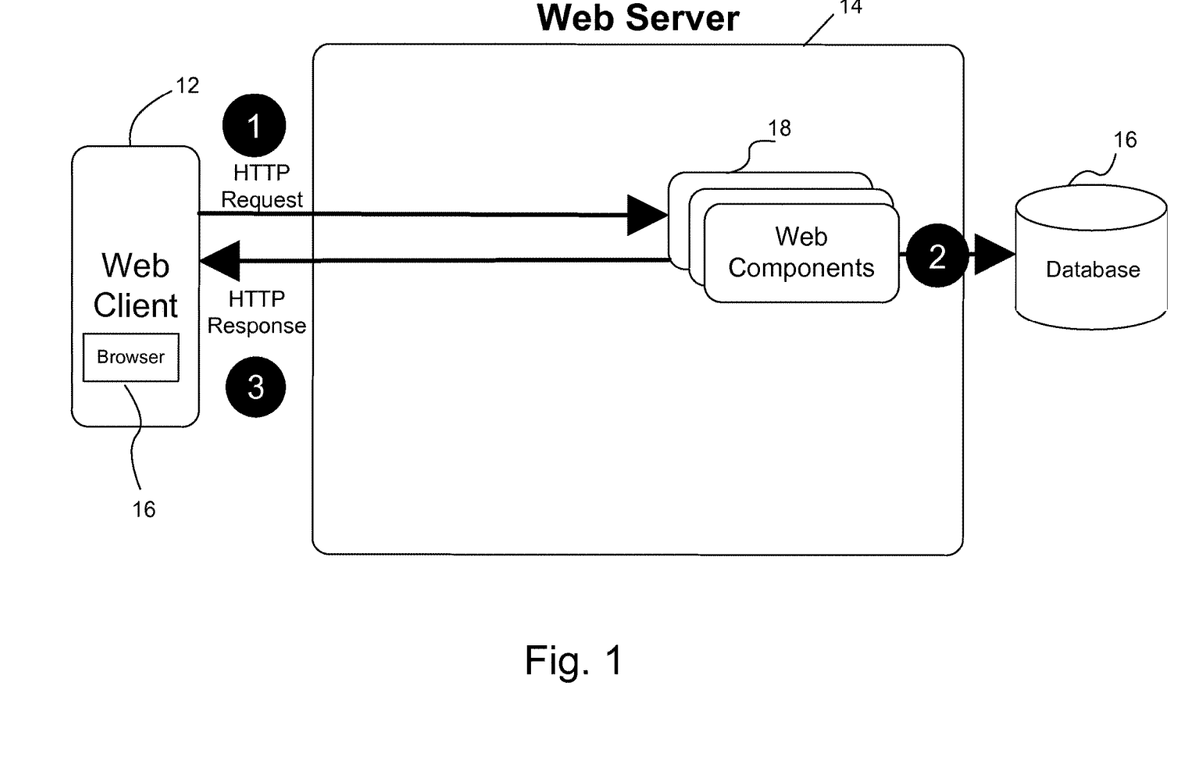
FIG. 1 is a block diagram of a client-server system connected to the internet.

A first example embodiment provides a web-based digital music personalization service. FIG. 1 depicts a web client 12 coupled to a web server 14 by the internet. In this example the web client 12 is executing a browser application 16 that communicates with web components 18 using HTTP Request and Response messages. Techniques for implementing browser applications and web components are well-known in the art and will not be described further herein.

Figure 2:
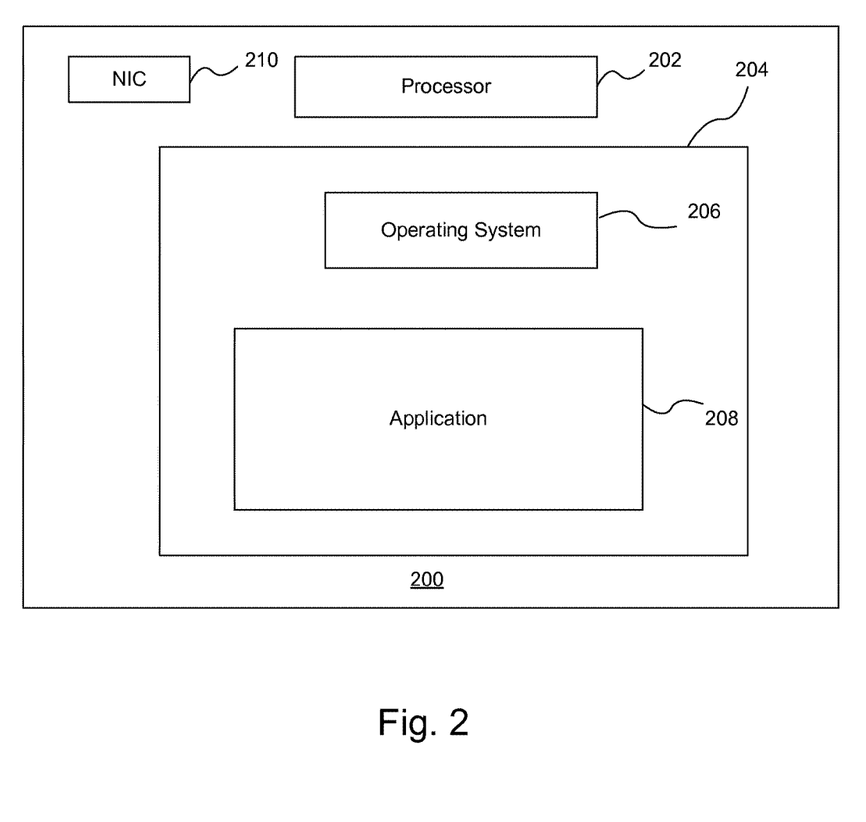
FIG. 2 is a simplified block diagram of a client or server computer.

FIG. 2 depicts a simplified block diagram of a computer system 200 that may be used to implement the web client or web server. As FIG. 2 shows, the computer system 200 includes a processor 202, a memory 204, an operating system 206, an application or logic 208 and a network interface card (NIC) 210. The application or logic 208 is stored on any suitable storage location or non-transitory computer-readable medium, such as memory 204. Application 208 provides instructions that enable processor 202 to perform the functions described herein.

Figure 3:
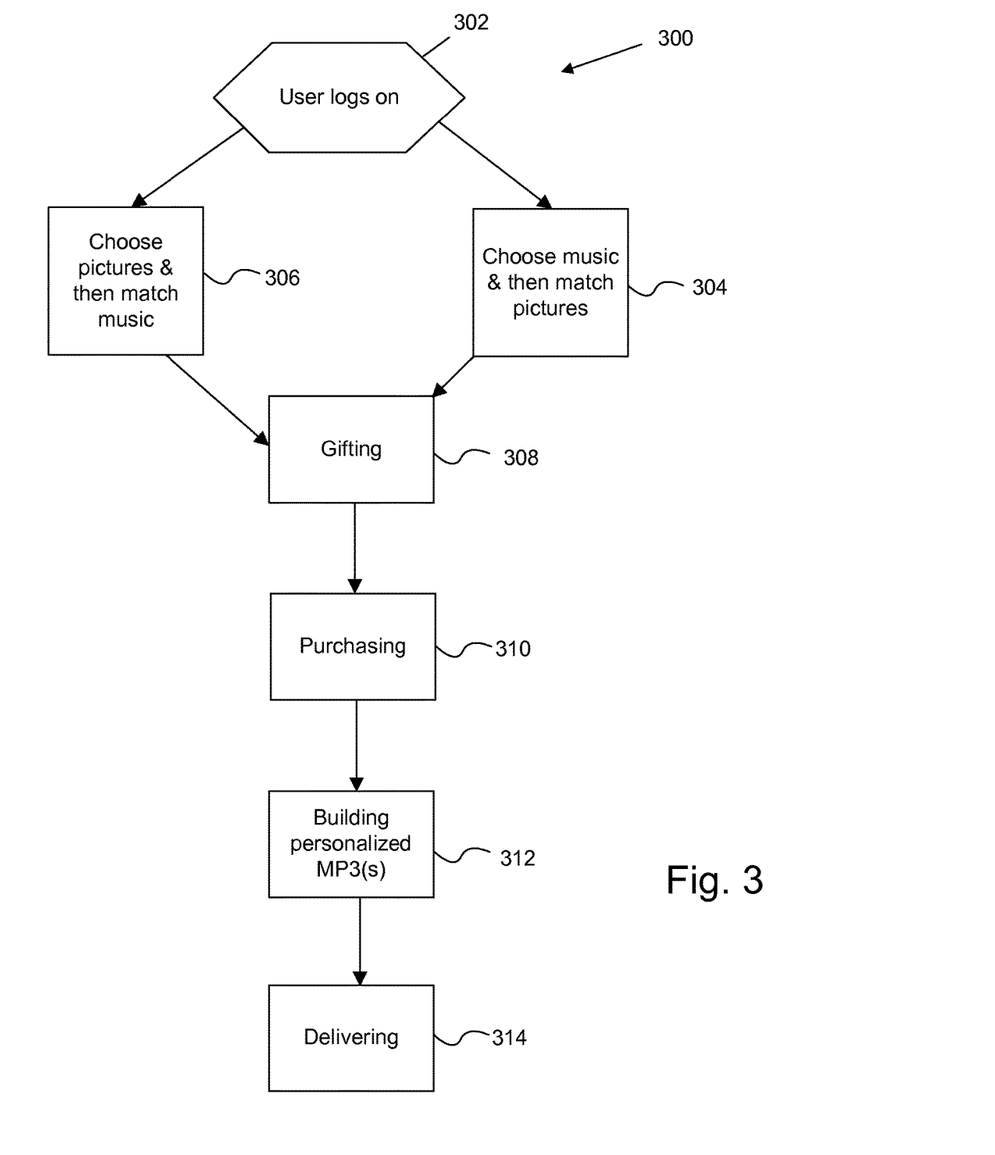
FIG. 3 is a flow chart illustrating the operation of an example embodiment.

A first example embodiment will now be described with reference to the flow chart of FIG. 3. The user logs on 302 to a music personalization web site where a user is a person interacting with the client computer. After user log on, the web server generates a first user interface page to allow the user to select a song 304 for personalization 304 and the first user interface page is displayed on the user's computer. Alternatively, the user may select a picture 306 for association with a song. The step of selecting a song first and then associating a picture will now be described.

Figure 4:
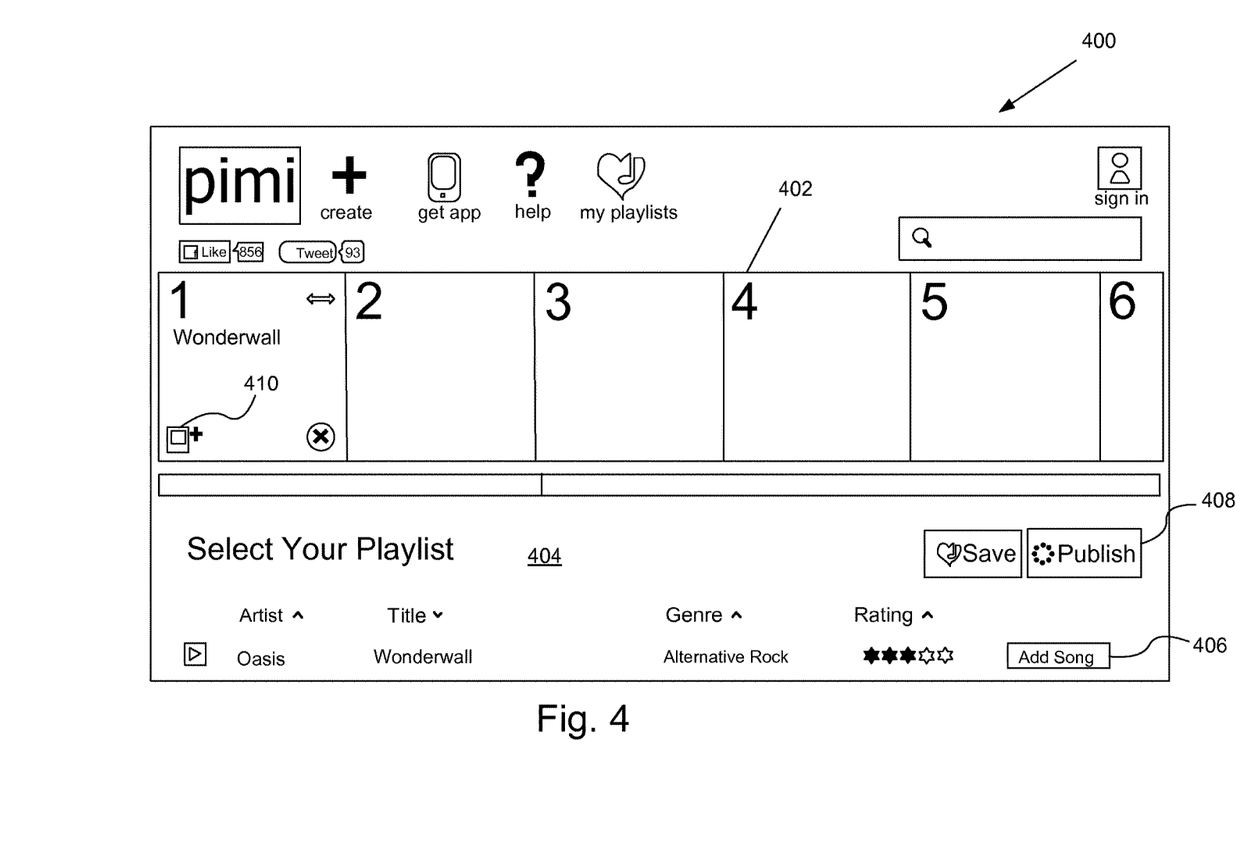
FIG. 4 is a screen shot depicting a first user interface page.

An example of the first user interface page 400 is depicted in FIG. 4. A row of song selection blocks 402 is displayed along with a selected playlist 404. The playlist 404 is selected by browsing or searching a catalog of music. The first user interface page also includes an "Add Song" button 406 and a "Publish" button 408.

In this example, the user selects a song first and then associates a picture with the song. When the user selects a song the title of the song is displayed in the first available song selection block 402 (in this example the song selection block labeled "1") and a picture selection icon 410 is displayed in the song selection block 402.

When the picture selection icon 410 is pressed the web server creates a second user interface page that is displayed on the client computer.

Figure 5:
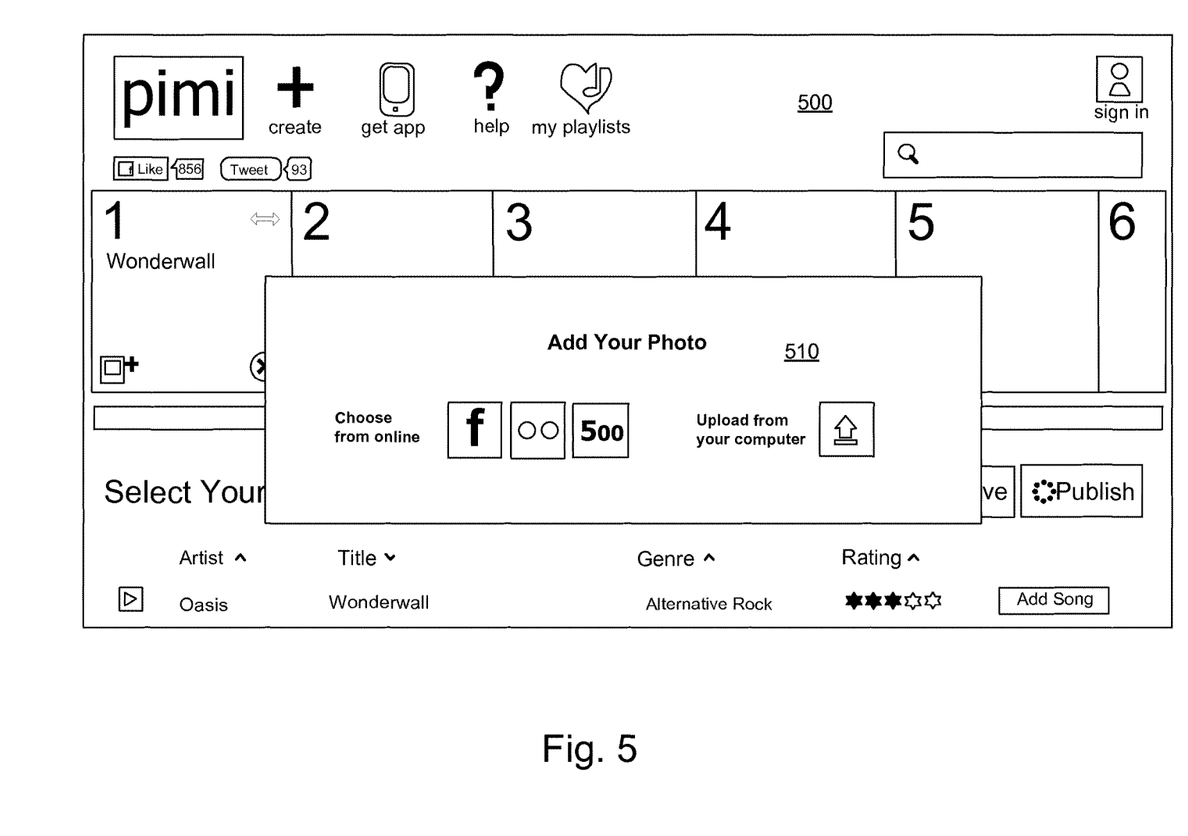
FIG. 5 is a screen shot depicting a second user interface page.

An example of the second user interface page 500 is depicted in FIG. 5. An "Add Your Photo" block 510 is displayed that includes buttons for selecting the source of a photo to be associated with the selected song. Examples of photo sources include third parties such as FaceBook, Flickr, DrobBox, etc. or a directory on the user's computers or other computers connected by a network.

Subsequent to source selection by the user a third user interface page is displayed that shows a photo, picture, group of photos or group of pictures displayed in the source on the user computer in the source format and also displays an "Add Photo" button. The user selects a picture by, for example, moving a selector over the picture to be selected and clicking the Add Photo button or by dragging and dropping a selected photo to the "Add Photo" button.

Figure 6:
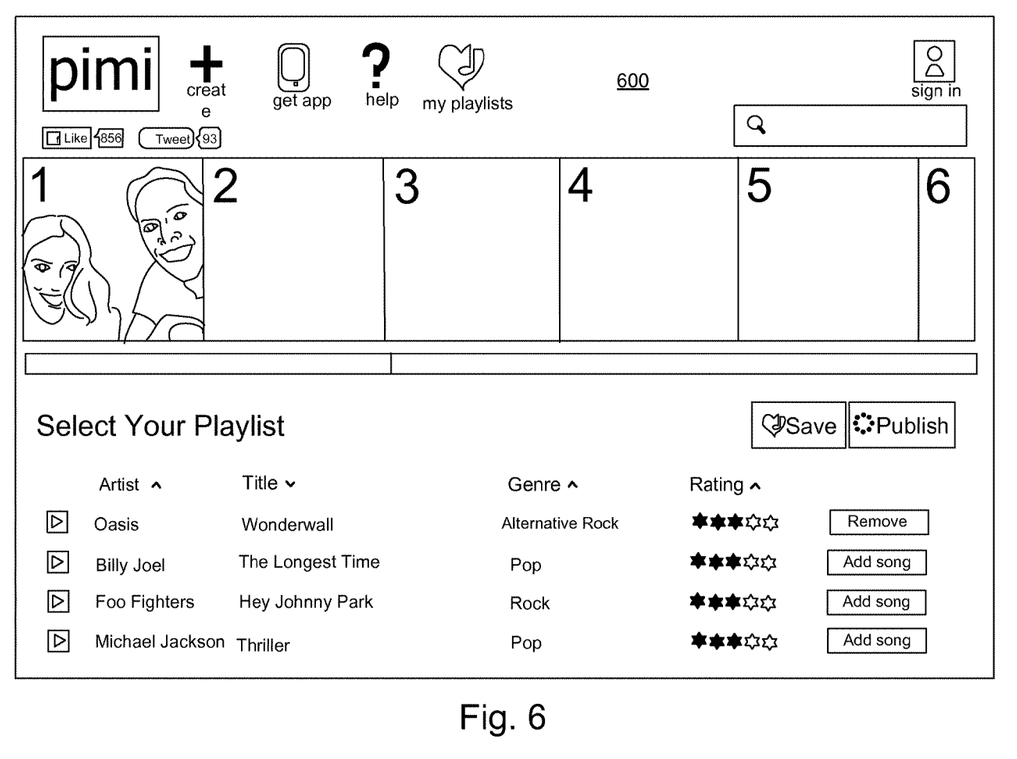
FIG. 6 is a screen shot depicting a fourth user interface page.

Subsequent to photo selection by the user 402 a fourth user interface page is displayed that shows the selected photo displayed in the song selection block. An example of the fourth user interface page 600 is depicted in FIG. 6.

The process of selecting songs and associating pictures with the selected songs may be repeated with each new selected song and associated picture displayed in one of the song selection blocks 31 of the first user interface page.

Referring back to FIG. 3, subsequent to matching a photo to music the steps of gifting the personalized music 308, purchasing the personalized music 310, building the personalized MP3s 312, and delivering the personalized MP3s 314 are performed.

In this example embodiment, the user is provided with a web service that allows the user to gift the customized music to friends, family or herself. The gifting process begins by pushing the "Publish" button 408 of the first user interface page 400.

Subsequent to the user pushing the "Publish" button 408 user interface pages for entering contact information of the gift recipient and a personalized message are displayed on the client computer. The contact information and personalized message are entered by the user and sent to the server computer over the internet.

Payment for the selected songs is performed using standard web-based payment procedures such as PayPal, Google Wallet, credit card payment etc.

Subsequent to payment, in an example embodiment, a personalized MP3 is built at the server computer and delivered to the gift recipient.

Figure 7:
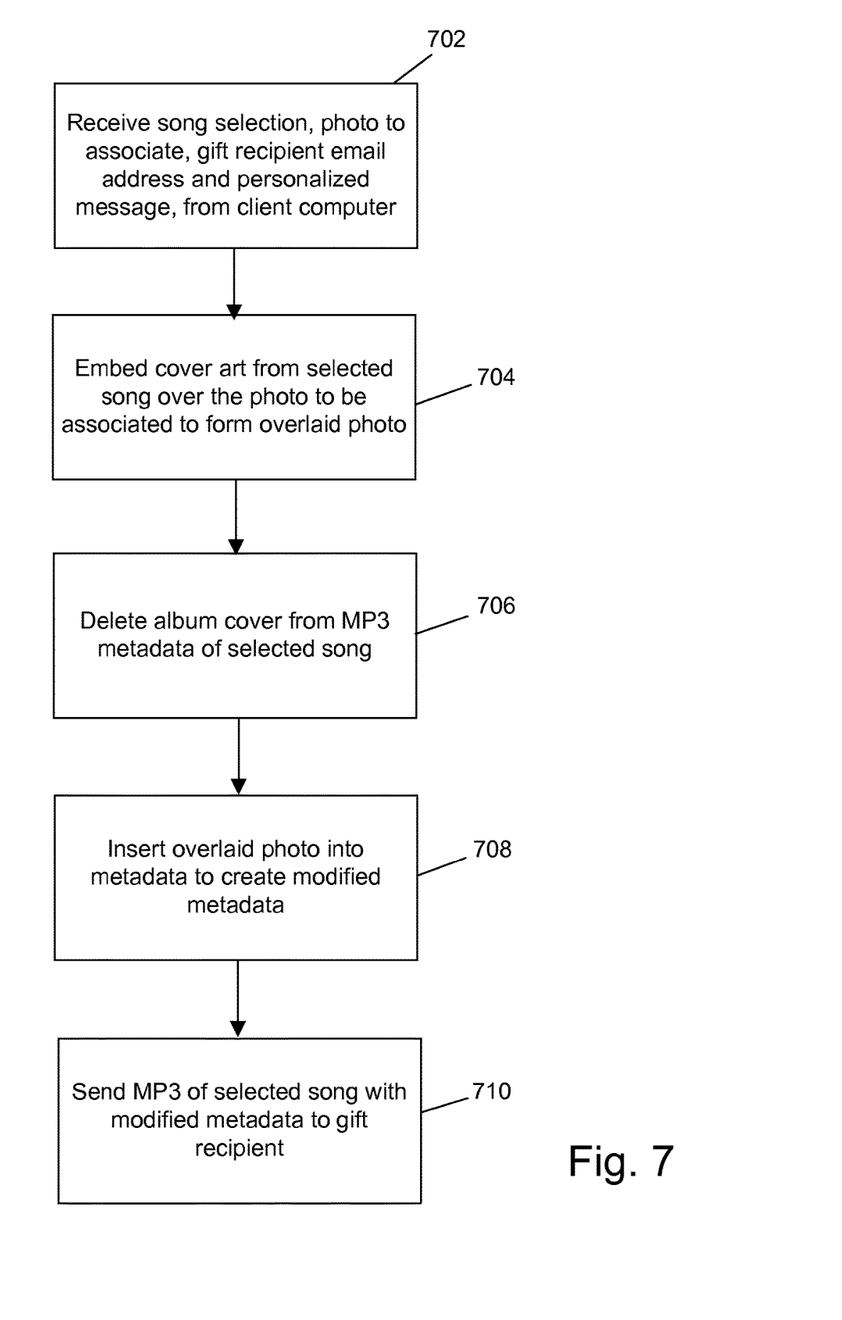
FIG. 7 is a flow chart illustrating the operation of an example server application.

FIG. 7 is a flow chart illustrating the steps performed by the server computer to build and deliver the selected, personalized music.

Referring to FIG. 7, in process step 702 the server computer application receives information regarding the song selected, the photo to be associated with the song selected, the address (for example email address) of the gift recipient and the personalized message.

In process step 704, the server computer application embeds the album cover art of the selected song over a portion of the associated photo to form an overlaid associated photo.

In process step 706 the server computer application deletes the album cover stored in the metadata file of the MP3 of the selected song and in process step 708 inserts the overlaid associated photo into the metadata to create a personalized MP3 file for the selected song that will display the overlaid associated photo when the song is played on any MP3 player that can display an album cover.

Finally, in process step 710 the personalized MP3 file is sent to the gift recipient along with the personalized message. Personalized MP3 files intended for a particular recipient are bundled. In one example embodiment an email is sent to a gift recipient that includes a tokenized URL that when clicked initiates a download of the bundled files intended for that gift recipient.

Figure 8:
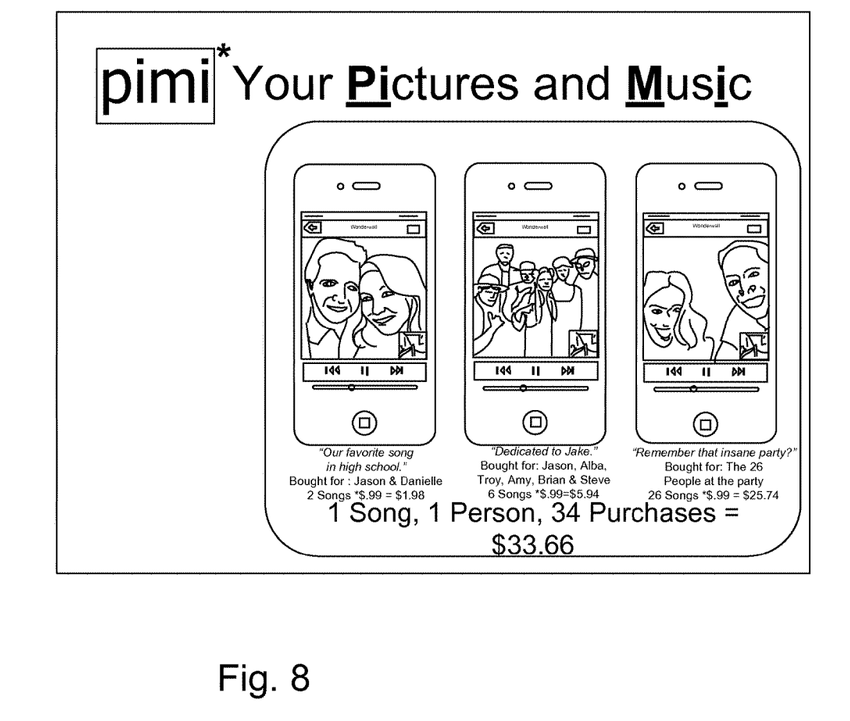
FIG. 8 is a diagram depicting an example of multiple purchases of the same song.

An advantage to content providers is that a user is incentivized to purchase multiple copies of the same song in order to personalize the song in different ways. An example that can result in the purchasing of thirty-four copies of the same song is depicted in FIG. 8. Referring to FIG. 8, in this example the user supplies a title for her creation on the individual song/picture level or for a grouping of songs/pictures. This title is then placed as the new title for each MP3. In addition, the server application defines additional metadata in the file to categorize this type of MP3 as part of a "pimi compilation" so as not to clutter the user's digital music library of MP3s.

For example, as depicted in FIG. 8, two copies of the song are bought as a gift for delivery to Jason and Danielle and have the title "Our favorite song in high school" and a selected photo. Six copies of the song are bought as a gift for delivery to Jason, Alba, Troy, Amy, Brian and Steve and have the title "Dedicated to Jake" and a selected photo. Twenty-six copies of the song are bought as a gift for twenty-six people who attended a party and have the title "Remember that insane party" and a selected photo.

Figure 9:
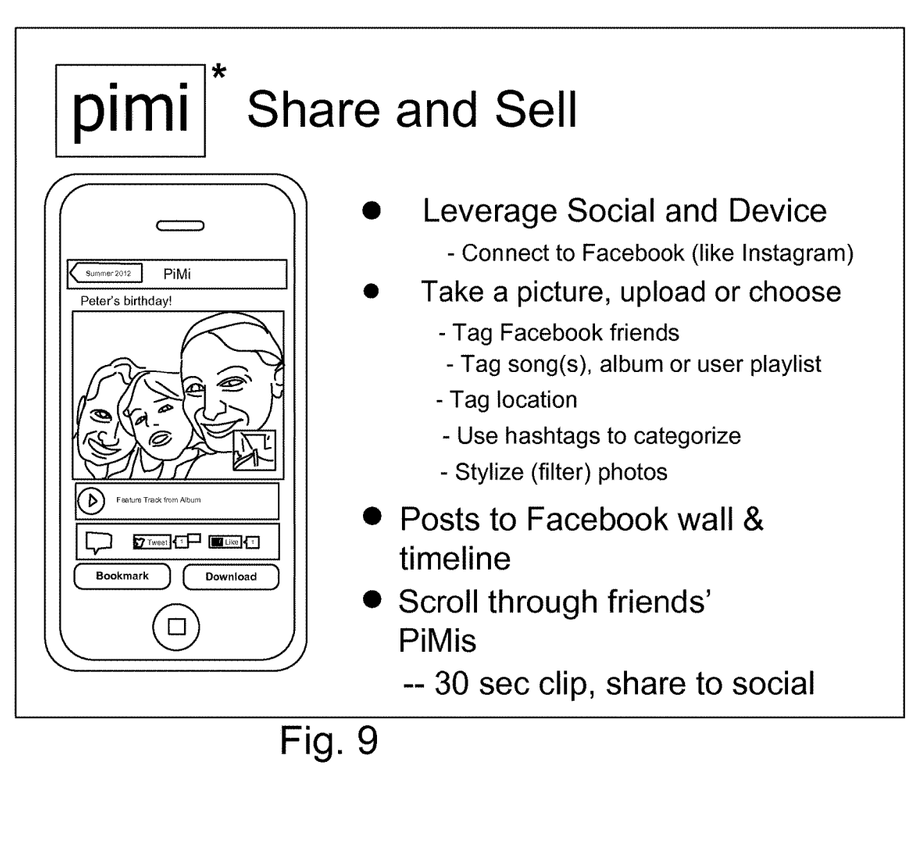
FIG. 9 is a screen shot illustrating the use of social media to distribute personalized music files.

FIG. 9 illustrates a method that allows the user to choose an existing picture or take a new picture with her device, then select a song, album or a grouping of songs compiled into a "playlist" and associate the selected song, album or grouping of song with the picture. The user can then make a note or "tag" each person in the picture and/or make note or "tag" the location where the picture was taken, categorize the picture and music using descriptive text known as "hashtags" and apply a filter to the picture to change the appearance and quality of the picture. The user can also apply a title or description of all the information and content mentioned above. The user then submits her creation and the new content is made available to other people to view, share on social networks and/or buy and/or gift.

Although the invention has been described with respect to particular embodiments thereof, these particular embodiments are merely illustrative, and not restrictive. For example, embodiments of the invention may apply to any type of music file that includes editable metadata. Further, instead of being provided by a web service the functions described above may be implemented by an application downloaded to a smart phone, personal digital assistant, or Pad device.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, application specific integrated circuits, programmable logic devices, field programmable gate arrays, or by the use of optical, chemical, biological, quantum or nanoengineered systems, components and mechanism. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. An apparatus providing a user interface for creating and sending an overlaid picture in association with a song, the apparatus comprising:
   one or more processors;
   a non-transitory memory storing program code including instructions executable by the one or more processors for:
   accepting a signal from a user input device coupled to the one or more processors to select one or more pictures displayed on the user interface;
   accepting a signal from the user input device to associate the one or more pictures with a selected song, wherein the song is digital;
   accepting a signal from the user input device to designate a plurality of recipients;
   automatically retrieving and displaying, on the user interface, album cover art associated with the song;
   automatically building a plurality of personalized versions of the song, wherein each personalized version includes the song and a respective overlaid picture that includes at least a portion of the album cover art over at least a portion of the respective overlaid picture;
   displaying, on the user interface, at least one overlaid picture of the overlaid pictures including at least a portion of the album cover art shown over at least the portion of the at least one overlaid picture; and
   transferring respective personalized versions of the song to the plurality of recipients so that when a recipient plays the song on a playback device the respective overlaid picture is displayed to the recipient.

2. The apparatus of claim 1, wherein the song is associated with a digital music file.

3. The apparatus of claim 2, wherein the digital music file includes an MP3 file.

4. The apparatus of claim 1, wherein the one or more processors are further configured to:
   display a user interface that enables selection of pictures from social media sites and networked storage devices.

5. The apparatus of claim 1, wherein the one or more processors are further configured to:
   display a user interface that enables entry of an intended recipient address and a personalized message.

6. The apparatus of claim 1, wherein the one or more processors are further configured to:
   bundle personalized digital music files intended for a recipient; and
   email a tokenized URL to the recipient for downloading the bundled personalized digital music files.

7. The apparatus of claim 1, wherein the one or more processors are further configured to:
   display a user interface for first selecting a song and then selecting a picture to associate with the song.

8. The apparatus of claim 1, wherein the one or more processors are further configured to:
   display a user interface for first selecting a picture and then associating a song with the picture.

9. The apparatus of claim 1, wherein the one or more processors are further configured to perform operations comprising:
   selecting a playlist displayed on a first user interface page of the user interface;
   displaying, in the first user interface page, a row of song selection blocks;
   in response to accepting a signal from the user input device to select a song, displaying a title of the song and a picture selection icon in a first block of the row of song selection blocks;
   in response to accepting a signal from the user input device to select the picture selection icon, creating and displaying a second user interface web page of the user interface;
   displaying an add your photo block in the second user interface web page, wherein the add your photo block includes buttons and wherein each of the buttons is for selecting one of a plurality of sources of pictures;
   in response to accepting a signal from the user input device to select a button indicating one of the sources, displaying a third user interface page that shows an add photo button and a displayed picture, wherein the third user interface page is part of the user interface;
   in response to accepting a signal from the user input device to drag and drop the displayed picture, wherein the displayed picture is selected for association with the song;
   in response to accepting a signal from the user input device to select the displayed picture, displaying a fourth user interface page that shows the displayed picture in the first block of the row of song selection blocks; and in response to accepting a signal from the user input device to select a publish button for building the personalized version of the song and transferring the personalized version of the song to the one or more recipients.

* * * * *